United States Patent
Raucci, Jr.

[11] Patent Number: 5,829,584
[45] Date of Patent: Nov. 3, 1998

[54] STORAGE CONTAINER FOR DIGITAL VIDEO DISKS

[76] Inventor: Charles Raucci, Jr., 6N327 Dinah Ct., Medinah, Ill. 60157

[21] Appl. No.: 901,615

[22] Filed: Jul. 28, 1997

[51] Int. Cl.[6] .................................................. B65D 85/57
[52] U.S. Cl. ........................................ 206/308.1; 206/472
[58] Field of Search .............................. 206/308.1, 308.2, 206/310, 472

[56] References Cited

U.S. PATENT DOCUMENTS

| | | | |
|---|---|---|---|
| 4,363,403 | 12/1982 | Raucci, Jr. et al. | 206/387 |
| 4,784,264 | 11/1988 | Sykes | 206/472 |
| 4,823,950 | 4/1989 | Roze | 206/472 |
| 5,090,078 | 2/1992 | Kamakura et al. | 206/310 |
| 5,609,250 | 3/1997 | Moser | 206/312 |
| 5,682,988 | 11/1997 | Salisbury | 206/308.1 |
| 5,697,498 | 12/1997 | Weisburn et al. | 206/308.1 |

*Primary Examiner*—David T. Fidel
*Attorney, Agent, or Firm*—Robert F. Van Epps

[57] ABSTRACT

A storage container for holding a commercially packaged compact video disk. The container is adapted for molding in a unitary structure of a thermoplastic material. The container cover is provided with opposed tabs for engaging the cover flap of the commercial package such that the same is opened when the container is opened. When molded of a substantially transparent thermoplastic material, the container allows display of the commercial package graphics.

4 Claims, 2 Drawing Sheets

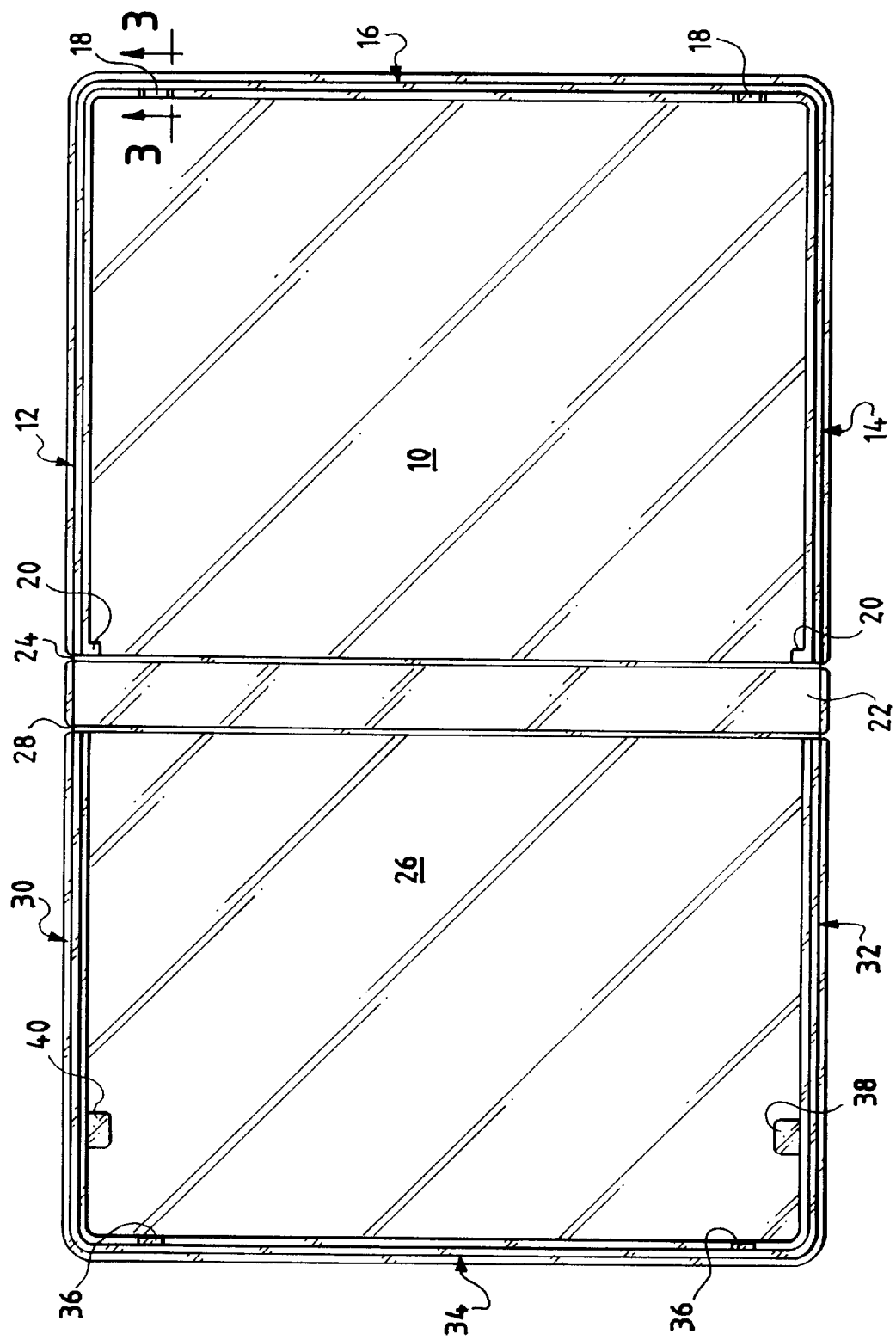

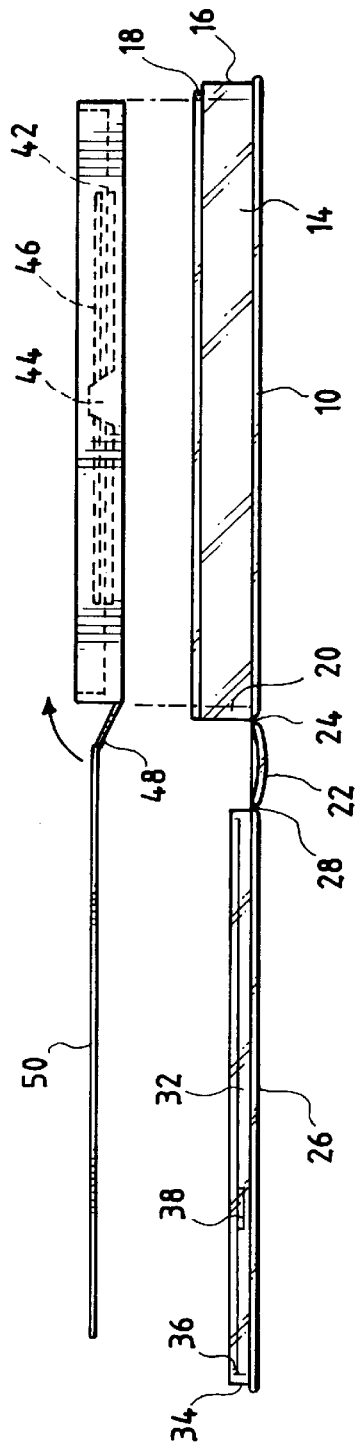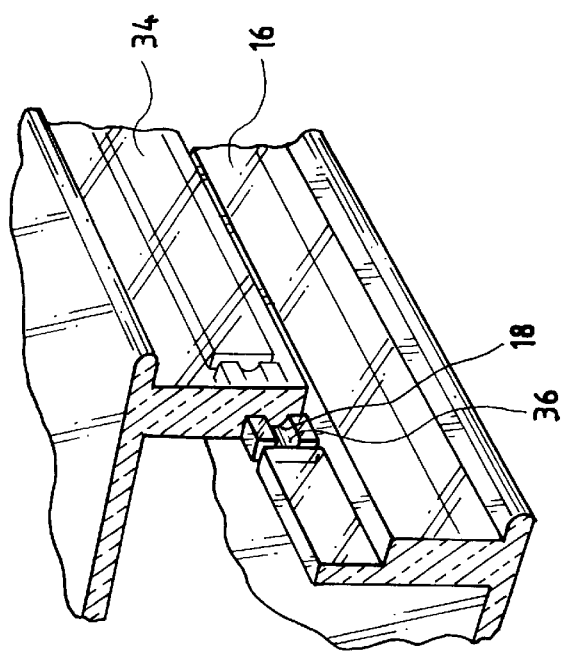

STORAGE CONTAINER FOR DIGITAL VIDEO DISKS

BACKGROUND OF THE INVENTION

1. Field of the Invention

The present invention relates generally to the field of containers and more particularly to an improved storage container for commercially packaged compact video disks.

2. Description of the Prior Art

With the introduction of the compact video disk that industry has settled on a somewhat flimsy commercial package consisting of a light weight plastic base adapted to receive and retain the disk and a cardboard cover flap also used to display graphic and text material relating to the disk contents. This commercial package is generally shrink-wrapped and is adequate for shipping and pre-sale display purposes. Once the disk is sold to the consumer or rental outlet, the commercial package is inadequate to withstand repeated handling and quickly deteriorates. A more substantial and durable container to protect the video disk during post-sale handling is therefore desirable.

Prior to the present invention, the inventor herein developed a molded plastic storage container for video tape cassettes which is the subject of U.S. Pat. No. 4,363,403 issued on Dec. 14, 1982 to Raucci, Jr. et al. That container has enjoyed substantial commercial success in the application for which it was designed and represents the most pertinent prior art known to the applicant herein.

OBJECTIVES AND SUMMARY OF THE INVENTION

From the preceding discussion, it will be understood that among the various objectives of the present invention are included the following:

the provision of a new and improved storage container for digital video disks;

the provision of a container of the above-described character adapted to receive and retain a digital video disk in its original commercial package;

the provision of a container of the above-described character formed of a substantially transparent thermoplastic material to permit display of the graphic and text material on the commercial package; and the provision of a container of the above-described character adapted to be molded as a unitary structure.

These and other objectives of the present invention are efficiently achieved by providing an integrally molded structure having a first substantially flat base surface with opposed outwardly stepped end walls and an outwardly stepped side wall extending along one edge between said end walls. A hinged spine extends along the edge of said base surface opposite the side wall. A second substantially flat cover surface hinged to the spine opposite the base surface and having inwardly stepped end walls and an inwardly stepped side wall extending along one edge between the end walls opposite the spine. When closed, the inwardly stepped walls of the cover surface engage the outwardly stepped walls of the base surface. The corners of the side walls may be provided with detents which, when engaged operate to frictionally lock the container in the closed position.

The interior of the base surface is adapted to receive the base of a commercially packaged digital video disk and the cover surface has two retainer tabs projecting interiorly from the end walls to engage and retain the cardboard cover flap of the commercial package. The entire storage case is preferably formed of a substantially transparent thermoplastic material such that the graphic and text material on the commercial package may be viewed through the storage case.

The foregoing as well as other objects, features and advantages of the present invention will become more apparent from the following detailed description taken in conjunction with the various view of the appended drawings.

BRIEF DESCRIPTION OF THE DRAWINGS

FIG. 1 is a top plan view of an open container in accordance with the principles of the present invention as molded in a unitary structure;

FIG. 2 is an end view of the container shown in FIG. 1;

FIG. 3 is a more detailed view of the locking detent with the container in a closed position.

DESCRIPTION OF PREFERRED EMBODIMENT

Turning now to FIG. 1 there is shown in plan view a digital video disk storage container as it would appear upon removal from a mold. The entire container is adapted to be molded in a single piece of a thermoplastic material such as polypropylene or a co-polymer. The view of FIG. 1 is of what in use will be the interior of the container.

A first, substantially flat base surface 10 is provided with opposed end walls 12 and 14 and a side wall 16. The wall depth corresponds to the thickness of the disk retaining base portion of a commercial digital video disk package. The walls 12, 14 and 16 are outwardly stepped which is intended to mean that an inner portion of each is slightly higher than the outer portion thereof.

The side wall 16 is provided adjacent each end thereof with the female portion 18 of a locking detent, the operation of which will be more fully described hereinbelow. Retaining stops 20 are molded in the base surface 10 such that the base portion of a commercial digital video disk package fits snugly within the walls 12 and 14 and against the stops 20.

A spine 22 is integrally molded to the edge of the base surface 10 by means of a so-called "living hinge" 24.

A second, substantially flat cover surface 26 is molded to the opposite edge of the spine 22 also by means of a "living hinge" 28. The cover surface is provided with end walls 30 and 32 and a side wall 34 each of which are inwardly stepped; i.e. the inner portion of each is slightly lower than the outer portion thereof. The side wall 34 is provided adjacent each end thereof with the male portion 36 of a locking detent aligned with the female portion 18 in the side wall 16 on the base surface 10.

The inner surface of each end wall 30 and 32 are provided with retaining tabs 38 and 40 located sufficiently above the cover surface 26 to receive the cardboard cover flap of a commercial digital video disk package.

FIG. 2 illustrates an end view of the container of FIG. 1 wherein like elements are identified by like reference characters. Also shown in FIG. 2 is a typical commercial package for a digital video disk. The commercial package comprises a light weight plastic base 42 having a center post 44 for frictionally engaging a digital video disk 46. A cardboard spine 48 and cover flap 50 are used to cover the package. Graphic and text material relating to the video disk content is displayed on the exterior surfaces of the package as well as the interior surface of the cover flap 50. By forming the container of the present invention of a substantially transparent thermoplastic material, the commercial graphics and text are visible and the disk may be identified without using any external labeling.

In the use of the present invention, the disk package cover flap 50 is inserted into the container cover 26 beneath the retaining tabs 38 and 40. The base portion of the disk package then is dropped into the container base 10 and is properly located by the retainer stops 20 and frictionally retained in place. When the cover 26 is closed, the inwardly stepped walls 30, 32 and 34 of the cover 26 engage the outwardly stepped walls 12, 14 and 16 of the base 10 to form a substantially dust proof container. The male and female portions, 36 and 18 of the locking detent engage to secure the cover 10 in the closed position.

FIG. 3 is an expanded partial perspective illustration of the locking detent wherein elements common to those shown in FIGS. 1 and 2 are identified by like reference characters.

From the foregoing description, it will be understood that the applicant has provided a new and improved storage container for commercially packaged digital video disks whereby the objectives set forth hereinabove are efficiently achieved. Since certain changes and modifications of the above-described invention will occur to those skilled in the art without departure from the scope of the invention, it is intended that all matter contained in the preceding description or shown in the appended drawings shall be interpreted as illustrative and not in a limiting sense.

Having described what is new and novel and desired to secure by Letters Patent, what is claimed is:

1. An improved storage container for a commercially packaged compact video disk adapted for molding in a unitary structure, said container comprising a first substantially flat base surface;

opposed end walls and a side wall disposed proximate the outer edge of said base surface, each of a depth at least equal to the thickness of the disk retaining portion of a commercial digital video disk package, and having an inner portion higher than an outer portion thereof;

a spine member hingedly molded to the edge of said base surface opposite said side wall;

a second substantially flat cover surface hingedly molded to the edge of said spine member opposite said base surface;

opposed end walls and a side wall disposed proximate the outer edge of said cover surface having an outer portion higher than an inner portion thereof;

a retaining tab disposed on the inner surface of each of the end walls of said cover surface and sufficiently above said cover surface to receive and retain the cover flap of a commercial video disk package;

whereby rotation of said cover surface toward and around said spine member causes closure of the commercial video disk package as the walls on said base and cover surfaces engage one another to thereby provide a closed container.

2. A container as defined in claim 1 further including the side walls disposed on said base and cover surfaces are provided with at least one aligned locking detent which when engaged retain the container in the closed position.

3. The container as defined in claim 1 further including a retaining stop disposed at the interior end of each of the end walls disposed on said base surface adjacent said spine member such that the base portion of a commercial digital video disk package is frictionally engaged by the walls of said base surface and against said retaining stops.

4. The container as defined in claim 1 wherein said container is formed of a substantially transparent thermoplastic material such that any graphic material displayed on the surfaces of the commercial digital video disk package are visible through said container.

* * * * *